(No Model.)
J. R. FARNHAM.
VACUUM PAN.
No. 472,209.　　　　　　　　　Patented Apr. 5, 1892.
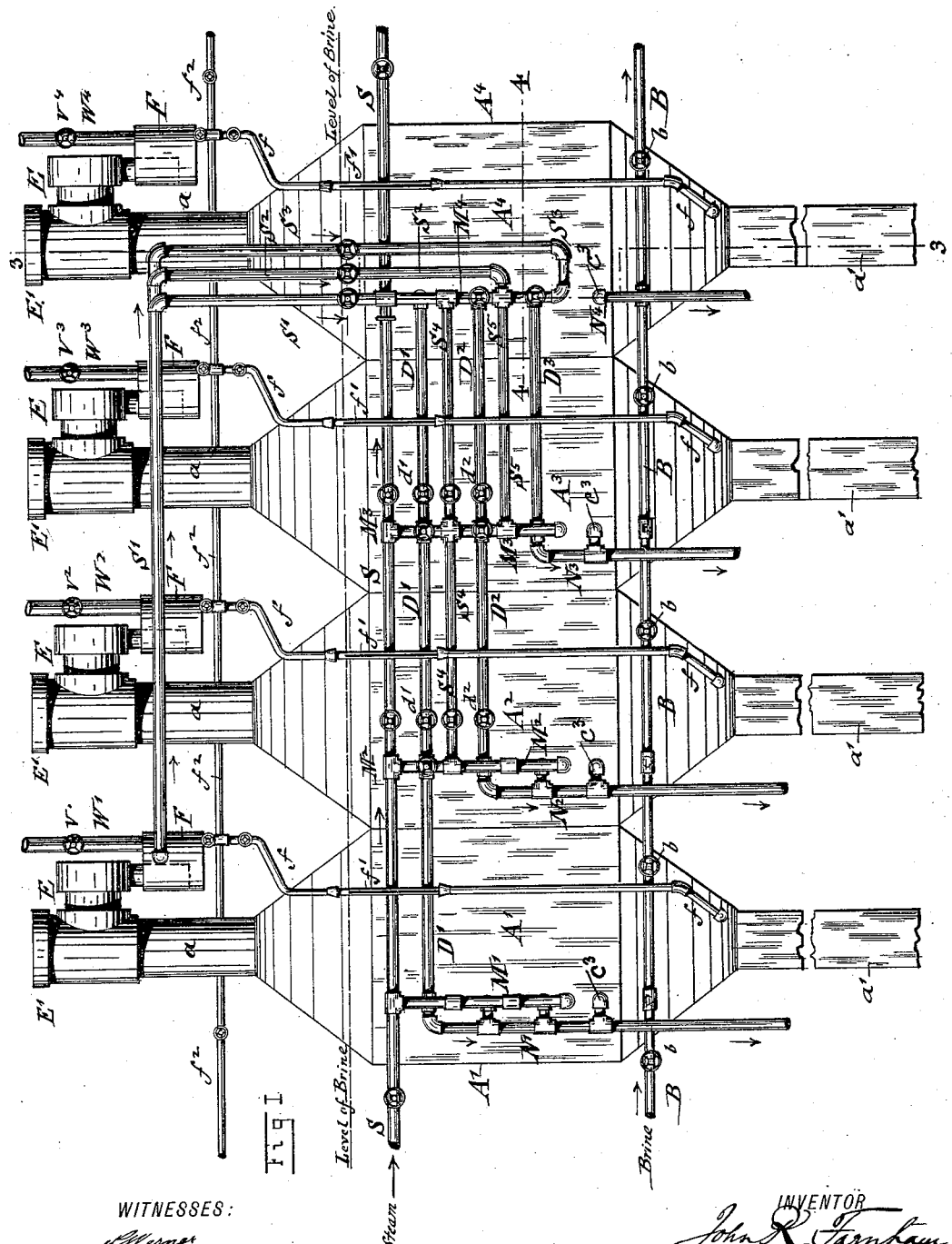
Fig. I
WITNESSES:
INVENTOR
John R. Farnham
BY
ATTORNEYS.

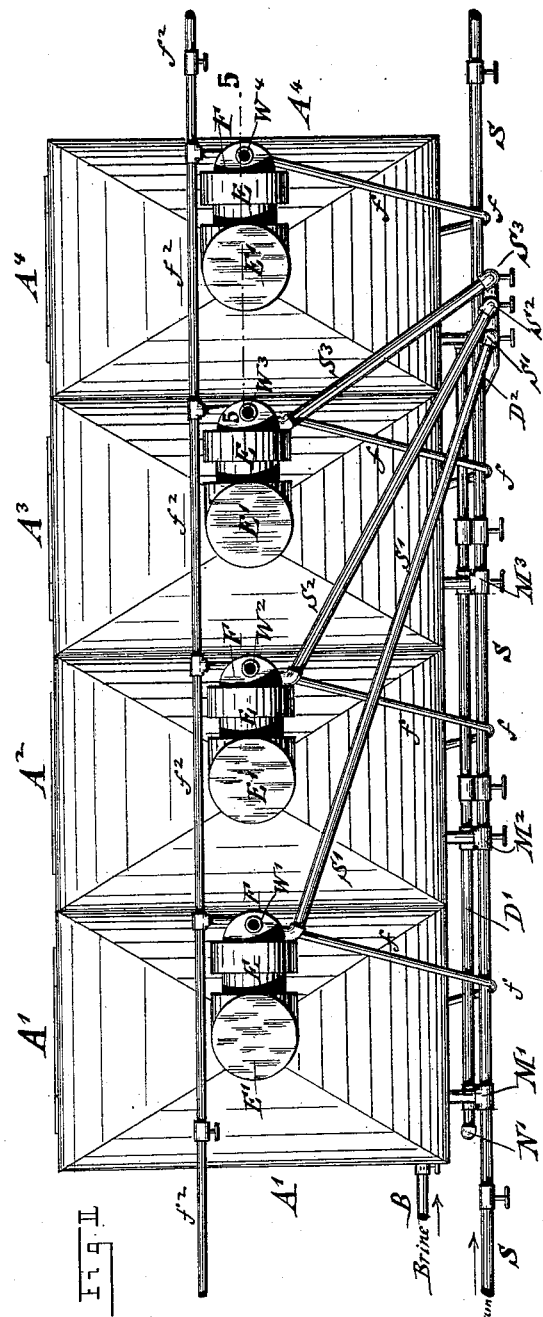

(No Model.) 3 Sheets—Sheet 3.
J. R. FARNHAM.
VACUUM PAN.
No. 472,209. Patented Apr. 5, 1892.
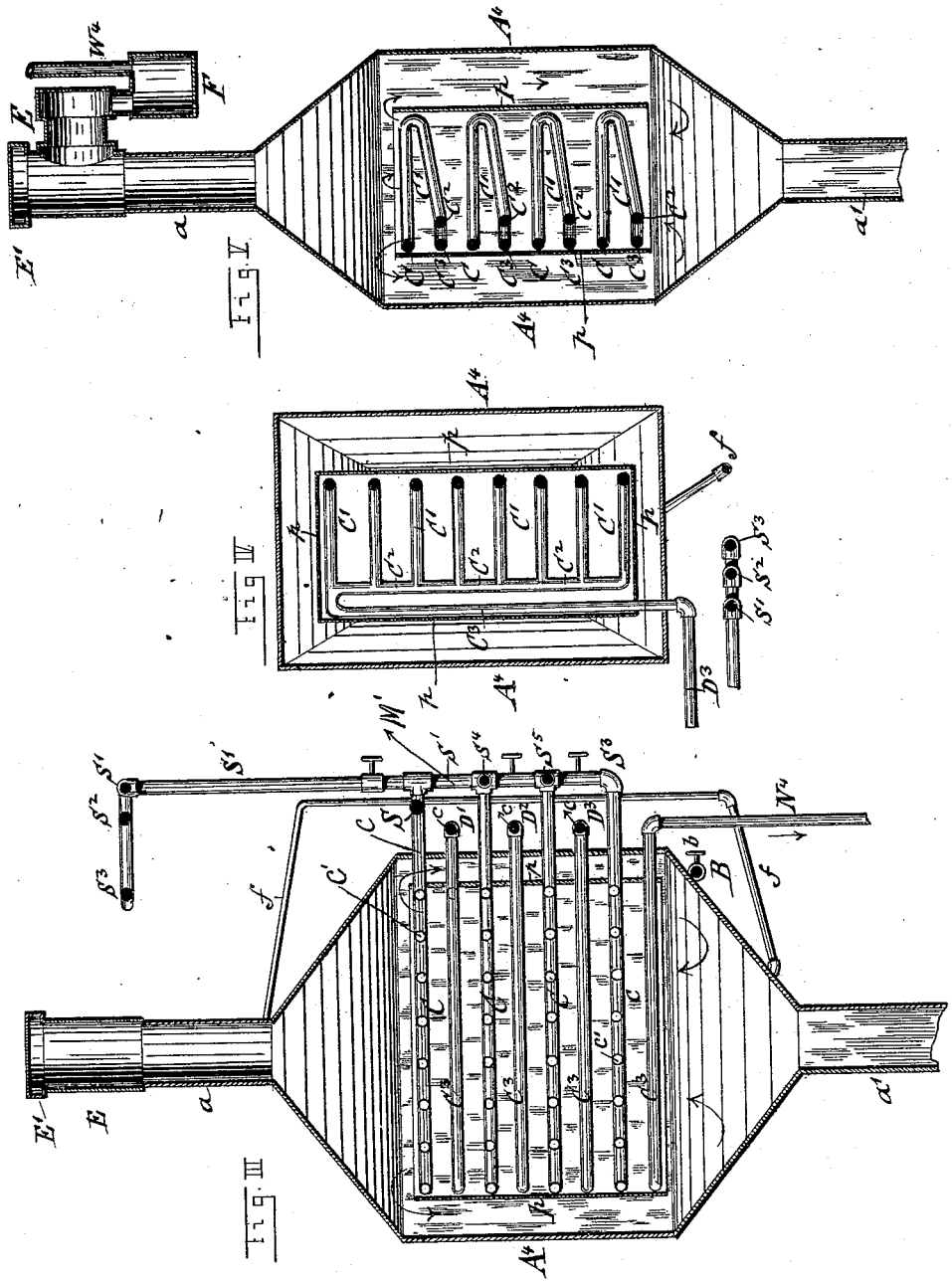
WITNESSES:
INVENTOR
John R. Farnham
BY
Forpee & Raegener
ATTORNEYS.

UNITED STATES PATENT OFFICE.

JOHN R. FARNHAM, OF BROOKLYN, NEW YORK.

VACUUM-PAN.

SPECIFICATION forming part of Letters Patent No. 472,209, dated April 5, 1892.

Application filed May 23, 1891. Serial No. 393,824. (No model.)

*To all whom it may concern:*

Be it known that I, JOHN R. FARNHAM, a citizen of the United States, and a resident of the city of Brooklyn, in the county of Kings and State of New York, have invented certain new and useful Improvements in Evaporating-Pans, of which the following is a specification.

This invention has reference to an improved evaporating apparatus for brine and other liquids in which the heat of the vapors that are produced in the different pans is utilized by conducting them to heating-coils in said pans, so as to produce thereby the more economical evaporation of the brine and other liquids on the principle of the so-called "multiple effect" in the more complete utilization of the heat; and the invention consists of an evaporating apparatus composed of a battery of pans, which are provided at their upper ends with save-alls and other accessories, and connected by vapor-pipes with manifolds in front of the different pans. The heating of the brine is produced by means of coil-sections, the uppermost sections of which are supplied with live steam, while the lower sections are supplied with the vapors drawn off from the upper ends of the pans by means of manifolds, while a second set of manifolds is connected by discharge-pipes with the outgoing ends of the coil-sections.

The invention consists, further, of certain details of construction, which will be fully described hereinafter, and finally pointed out in the claims.

In the accompanying drawings, Figure I represents a front elevation of my improved evaporating apparatus, shown as composed of four pans. Fig. II is a plan of the pans and their connecting pipes. Fig. III is a vertical transverse section of one of the pans on the line 3 3, Fig. I. Fig. IV is a horizontal section on the line 4 4, Fig. I; and Fig. V is a vertical longitudinal section on the line 5 5, Fig. II.

Similar letters of reference indicate corresponding parts.

Referring to the drawings, $A'$, $A^2$, $A^3$, and $A^4$ represent four different evaporating-pans, which are connected in battery with each other. The pans are filled with brine or other liquid to be evaporated up to the dotted line at the upper part of the pans, as shown in Fig. I, by means of a supply-pipe B, which is provided with a number of valves $b$, so as to permit the filling of the different pans.

The bodies of the pans $A'$, $A^2$, $A^3$, and $A^4$ are preferably made of oblong shape, and provided with tapering upper and lower portions which connect, respectively, at their upper and lower ends with vertical pipes $a$ $a$ and $a'$ $a'$, the lower pipes $a'$ collecting the salt which is deposited from the brine and dropped by gravity, while the upper pipes connect by suitable goose-necks E, having detachable caps $E'$, with save-alls F, and with waste-pipes $W'$, $W^2$, $W^3$, and $W^4$, which are provided, respectively, with valves $v'$ $v^2$ $v^3$ $v^4$ for shutting off the waste-pipes individually, so as to permit the vacuum-producing apparatus that is connected with the last waste-pipe $W^4$ to act on the surface of the brine in some of the pans.

The pans $A'$, $A^2$, $A^3$, and $A^4$ are constructed of boiler-iron, stone slabs, or other suitable material, and connected with different manifolds for the steam and vapor supplying and discharging pipes at the front part of the pans, while the rear walls of the pans are provided with doors or man-holes for the proper cleaning of the heating-coils in the pans.

The save-alls F are connected by vertical pipes $f$ with the tapering lower portions of the pans, said vertical pipes being provided at the level of the brine or other liquid to be evaporated with glass tubes $f'$, that act as gages by which the level of the brine in the pans can be readily observed. The pipes $f$ serve, also, to conduct the priming or unevaporated brine that is carried up by the vapors and collected in the save-alls back to the lower portions of the pans. The return-pipes $f$ are connected at their upper ends by a horizontal pipe $f^2$, through which steam or water may be introduced for the purpose of cleaning the pipes and the save-alls.

The primary evaporation in the different pans is produced by means of live steam, which is supplied from a suitable boiler. This steam is introduced into the evaporating-pans near the level of the brine in the same, and supplied by means of a horizontal steam-supply pipe S, which extends along the front part of the pans, and is provided with suitable valves, so that one or more pans may be cut out when it is required for cleaning the same. The live-steam pipe S is connected with vertical manifolds M' M² M³ M⁴ in front of the pans, which manifolds are connected with coil-sections that are located in the interior of the pans and supported in suitable manner therein. These coil-sections are formed of longitudinal pipes C, that extend horizontally from the manifolds to the rear part of each pan, and of a number of lateral branches of V or other shape C', that extend laterally from the pipe C and are connected at their lower ends with longitudinal pipes C², which communicate at their rear ends with longitudinal pipes C³, which are parallel to the pipes C², and are located vertically below the first longitudinal pipe C. The pipes C³ extend through the front wall of the pans to the outside of the same, and are connected with horizontal discharge-pipes D' D² D³, that extend below the steam-supply pipe S in front of the pans, and communicate by a second set of manifolds N' N² N³ N⁴ with the outlet ends of the longitudinal pipes C³ of the coil-sections, so that the water of condensation collected in the same is conveyed off. The discharge-pipes D' and D² are also provided with valves $d'$ $d^2$ at the proper points, so as to properly regulate the flow of the surplus steam, surplus vapors, and products of condensation from the same, and also for facilitating the cutting out of any one of the pans when it is desired to clean the same.

On the inside of the pans is arranged a casing $p$, which surrounds the heating-coil sections at both sides and at the front and rear ends of the same, but which is open at the top and bottom, so that the convection-currents in the pans are readily kept up, as indicated by the arrows in Figs. III and V.

The evaporation in the pan A' is produced by live steam entirely, the same being supplied through the manifold M' to the coil-sections in the same, while the water of condensation and the uncondensed steam are conducted off through the manifold N', as shown in Fig. I. For the purpose of utilizing the heat of the vapors generated by the boiling of the brine in the pans A', A², and A³, the vapors are conducted from the save-alls F by means of conducting-pipes S', S², and S³ to the manifold M⁴ of the pan A⁴ and from the same by horizontal pipes S⁴ and S⁵, respectively, to the pans A² and A³. The pan A² is supplied with vapors from the pan A' by the pipes S' and S⁴, all the coil-sections below the uppermost section which is heated by live steam being heated by the vapors drawn off from the pan A', while the surplus vapors and the water of condensation are conducted off by the manifold N² in the same manner as they are conducted off by the manifold N' from the coil-sections of the pan A'. In like manner the vapor-conducting pipes S² S⁵ communicate with the manifold M³ of the pan A³ and supply the lower coil-sections of said pan with the vapors obtained from the pan A², while the surplus vapors and the water of condensation are drawn off through the manifold N³. The vapors of the pan A³ are conducted by the pipe S³ to the manifold M⁴ and to the lowermost coil-section of the pan A⁴, while the surplus vapors and the water of condensation are drawn off through the discharge-pipe N⁴, which, for the pan A⁴, takes the place of the manifolds N' N² N³ of the pans A', A², and A³, all as shown in Fig. I.

From the foregoing it is seen that all the surplus live steam and water of condensation is drawn off from the uppermost coil-sections of all the pans by means of the discharge-pipe D' to the manifold N' of the pan A', while the surplus vapors supplied by the vapor-conducting pipes S', S², and S³ and their products of condensation are drawn off, respectively, from the lower coil-sections of the pans A² and A³ by the discharge-pipes D² D³, manifolds N² and N³, and the pipe N⁴ of the pans A², A³, and A⁴. It is obvious from the foregoing that the highest temperature and pressure are produced in the pan A', while a somewhat lower temperature and pressure are obtained in the pan A², and still lower temperatures and pressures, respectively, in the pans A³ and A⁴, the first two pans being operated above atmospheric pressure, while the last two pans are operated by means of a vacuum below atmospheric pressure. The difference in temperature is preferably so arranged that the four pans work at about a difference of temperature of 40° Fahrenheit, one lower than the other, whereby the salt can be deposited from the brine in a quicker or slower manner, according to the quality of the grain to be produced. At the same time the heat of the vapors that are evaporated by the pans is utilized instead of being permitted to pass off into the atmosphere. The evaporating-pans are thereby run at a considerable saving in fuel, owing to the so-called "multiple effect" produced by the utilization of the vapors evaporated by the same. When it is desired to heat up any one of the pans A², A³, or A⁴ with live steam, the manifolds M², M³, and M⁴ of the same are connected with the live-steam pipe S and disconnected from the vapor-pipes, so that the dropping of the salt in the same is accelerated. Any one of the pans can be cut out so as to permit the cleaning of the same, which is accomplished by opening the door or manhole in the rear wall (not shown in the drawings) and washing off the salt deposited on the coil-sections by means of hot water sprayed on the same. The goose-necks E at the ends of the upper pipes $a$ of the pans and the save-alls F can likewise be readily cleaned by removing the caps of the goose-necks and by supplying water by a suitable hose without opening the doors in the rear wall. The coil-sections in the pans are made removable, so that any number of the same may be used according to the requirements of a variable steam or brine supply. It is obvious that the waste-pipe of the last pan of the battery, as well as the lower ends of the manifolds N' N² N³ and discharge-pipe N⁴, have to be connected respectively with a suction-pump and with a steam trap or condenser for conveying away the water of condensation and any unused steam or vapors. The vertical pipes $a'$ below the pans, into which the salt falls by gravity, are provided with suitable valves for collecting the salt in the vertical pipes, while suitable force-pumps are employed for forcing the brine into the pan working at a higher pressure or from one pan into the other or into all the pans. Provision may also be made for maintaining a proper level of the brine either automatically or by supplying a certain quantity from time to time, as required. These accessories, however, are well known and are used in all evaporating-pans in which brine or liquids are evaporated. Care has to be taken, however, that the size and shape of the pans be so adjusted in proportion to the number and shape of the coil-sections in the interior of the same that, first, the heating-coil sections are arranged as near as possible to the level of the column of brine in the pan, so that the ebullition takes place mainly at the upper part of the column of brine while the lower part of the same is comparatively at rest and at a lower temperature, which is conducive to the uniform formation of the salt-crystals; and, secondly, that the space inclosed by the casing surrounding the coil-sections should be so proportioned that the convection-currents of the brine are not needlessly interrupted and that the motion of the brine in the pans is freely kept up, the same passing from the ebullition-point downward between the casing and the side walls to the lower portions of the pans and up again over the heating-coil sections to the ebullition-point, and so on, whereby a rapid and effective evaporation is obtained.

Having thus described my invention, I claim as new and desire to secure by Letters Patent—

1. The combination of a battery of evaporating-pans, a brine-supply pipe for said pans, heating-coil sections arranged in said pans, a steam-supply pipe connecting the uppermost coil-sections of the different pans, a discharge-pipe for the uppermost coil-sections, manifolds in front of the pans, vapor-pipes connecting the upper ends of the pans with said manifolds, discharge-pipes for the lower coil-sections, and outlet-manifolds for the discharging-pipes for conducting off the surplus steam, vapors, and water of condensation, substantially as set forth.

2. The combination, with an evaporating-pan, of an inner casing, a series of U-tubes arranged within the casing, said tubes being connected at their ingoing ends with a manifold and at their other ends with longitudinal pipes, additional longitudinal pipes running parallel with the first longitudinal pipes, and manifolds communicating with the outgoing ends of the second longitudinal pipes of the coil-sections, substantially as described.

In testimony that I claim the foregoing as my invention I have signed my name in presence of two subscribing witnesses.

JOHN R. FARNHAM.

Witnesses:
PAUL GOEPEL,
CHARLES SCHROEDER.